(12) United States Patent
Groux (10) Patent No.: US 8,473,637 B2
(45) Date of Patent: Jun. 25, 2013

(54) METHOD AND APPARATUS FOR EXTENDED ORDERING OVER A WIRELESS NETWORK OF COLLECTIONS USING PRIORITY AND DEPENDENCY LEVELS

(75) Inventor: Bran Groux, Kitchener (CA)

(73) Assignee: Research In Motion Limited, Waterloo, CA (US)

( * ) Notice: Subject to any disclaimer, the term of this patent is extended or adjusted under 35 U.S.C. 154(b) by 1134 days.

(21) Appl. No.: 11/678,399

(22) Filed: Feb. 23, 2007

(65) Prior Publication Data

US 2008/0209074 A1    Aug. 28, 2008

(51) Int. Cl.
G06F 15/16    (2006.01)
H04J 3/06    (2006.01)

(52) U.S. Cl.
USPC .......................................... 709/248; 370/503

(58) Field of Classification Search
USPC ... 709/207, 248; 370/324, 350, 503; 375/354, 375/356
See application file for complete search history.

(56) References Cited

U.S. PATENT DOCUMENTS

| | | | |
|---|---|---|---|
| 6,601,076 B1* | 7/2003 | McCaw et al. | 1/1 |
| 2004/0158646 A1* | 8/2004 | Miernik et al. | 709/249 |
| 2005/0018627 A1* | 1/2005 | Cardei et al. | 370/328 |
| 2005/0083935 A1* | 4/2005 | Kounavis et al. | 370/392 |
| 2005/0147130 A1* | 7/2005 | Hurwitz et al. | 370/503 |

* cited by examiner

*Primary Examiner* — Wing F Chan
*Assistant Examiner* — David X Yi
(74) *Attorney, Agent, or Firm* — Moffat & Co.

(57) ABSTRACT

A method and system for extended ordering of collections of data for synchronization over a wireless network, each collection having an existing priority level, the method having the steps of: adding, to each collection, a dependency field having a dependency value; exchanging the priority level and dependency value for each collection; and ordering synchronization of the collections based on priority levels and dependency values of the collections.

7 Claims, 5 Drawing Sheets

METHOD AND APPARATUS FOR EXTENDED ORDERING OVER A WIRELESS NETWORK OF COLLECTIONS USING PRIORITY AND DEPENDENCY LEVELS

FIELD OF THE DISCLOSURE

The present disclosure relates to the synchronization of data between a mobile device and a network node and, in particular, to the ordering of the synchronization of data between the mobile device and network node.

BACKGROUND

A mobile device stores a number of databases or collections, hereinafter referred to as collections, that periodically need to be synchronized with a network node. Such a synchronization ensures that the collections stored on the network node are the same as those stored on the mobile device.

In order to ensure that synchronization occurs in a particular order, prior art solutions assign a priority number to each collection, where the priority number represents the order in which the collection is synchronized. In order to ensure simplicity, a limited number of priority levels are available in these prior solutions. Thus, each collection could be assigned, for example, a priority from 1-10. This priority ordinal could be sent to the network node as part of an initialization packet. The network node could then use the ordinal to order the returning packets to the device, thereby forcing the network node to perform the synchronization in a predetermined collections order.

The above solution, however, does not accommodate devices with a larger number of collections. Nor does it accommodate devices in which some collections become dependent on each other. By assigning various collections the same priority level, the network node can choose which collection to return first, creating a haphazard ordering system which could cause problems if a collection, which is dependent on another collection, is synchronized out of order.

BRIEF DESCRIPTION OF THE DRAWINGS

The present application will be better understood with reference to the drawings in which.

DETAILED DESCRIPTION

The present disclosure provides for a dependency field to be added to each priority level. In a preferred embodiment, the dependency field would be one byte, thereby allowing each priority level to be subdivided into dependency levels 1-255. However, in other cases where a larger number of collections are present on the mobile device, multiple bytes could be used. By adding a dependency level to a priority field, existing priority level schemes could be used on the mobile device without having to extend the priority scheme to an unmanageable number of priority levels. Further, dependencies could be established to ensure that collections are synchronized in the correct order.

The present disclosure therefore provides a method for extended ordering of collections of data for synchronization over a wireless network, each collection having an existing priority level, the method comprising the steps of: adding, to each collection, a dependency field having a dependency value; and exchanging, during synchronization, the priority level and dependency value for each collection, wherein synchronization is ordered based on priority levels and dependency values of the collections.

The present application further provides a mobile device adapted for extended ordering of collections of data for synchronization over a wireless network, each collection having an existing priority level, the method comprising the steps of: adding, to each collection, a dependency field having a dependency value; exchanging the priority level and dependency value for each collection; and ordering synchronization of the collections based on priority levels and dependency values of the collections.

Figure 1:
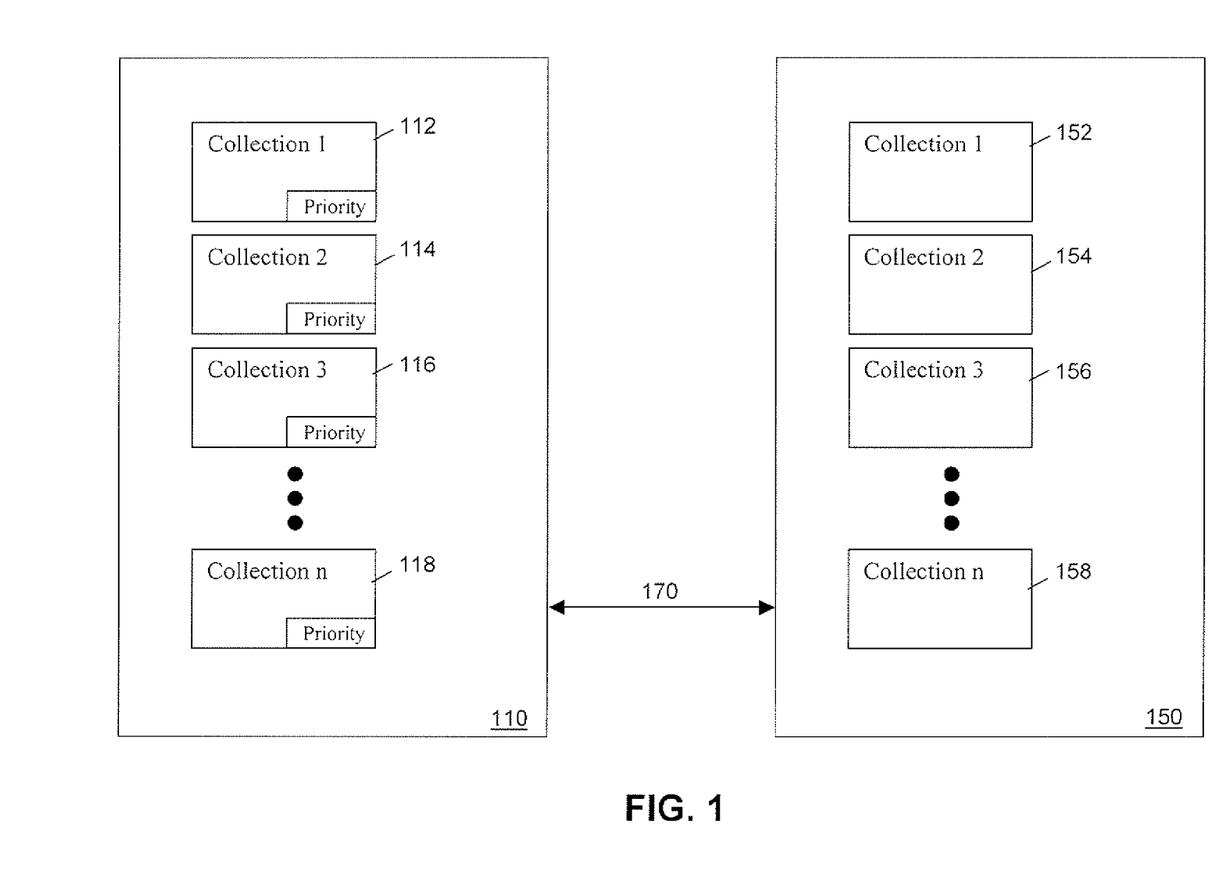
FIG. 1 is a block diagram illustrating a series of collections having a priority on the mobile device and a series of collections on the network node.

Reference is now made to the drawings. FIG. 1 illustrates a block diagram showing a mobile device 110 and a network node 150. As will be appreciated by those skilled in the art, mobile device 110 could be any mobile device having collections that need to be synchronized with a network node. Such devices include, but are not limited to, cellular telephones, personal digital assistance, pagers, laptop computers and portable data devices.

An exemplary mobile device is illustrated with reference to FIG. 5 below.

As is seen in FIG. 1, mobile device 110 includes a series of collections, labeled as a first collection 112, a second collection 114, a third collection 116 and collection n 118, where "n" is a positive integer. Each of collections 112, 114, 116 and 118 includes a priority associated therewith.

A network node 150 includes a first collection 152, a second collection 154, a third collection 156 and collection n 158, where n is a positive integer.

In operation, a first collection 112 needs to synchronize with a first collection 152, a second collection 114 needs to synchronize with a second collection 154, a third collection 116 needs to synchronize with a third collection 156 and so on, until collection n 118 synchronizes with collection n 158. However, the order in which the collections synchronize may depend on various factors and thus the priority of each collection can be set.

In operation, when mobile device 110 connects to network node 150 through an interface 170, a synchronization may occur. Interface 170 can be any connection between mobile device 110 and network node 150, including an over-the-air connection such as a radio frequency cellular network connection or a WiFi connection, a short-range wireless connection such as Bluetooth™ or IrDA, or a physical connection such as a serial connection using a universal serial bus (USB) connection. Other possible connections would be known to those skilled in the art.

In order for synchronization to occur, when interface 170 is established between mobile device 110 and network node 150, mobile device 110 sends network node 150 the priorities of each of its collections. Network node 150 can then order commands for the returning packets to mobile device 110. As will be appreciated, commands include record level commands such as 'add' or 'delete', or could include collection level commands such as a hash function or a command to use a collection.

In an alternative embodiment, the actual packets may be ordered. This therefore forces the network node to initialize and perform the first synchronization in a predetermined database order.

As indicated above, the use of a priority by itself is however limiting. Specifically, if a limited number of priorities are available, then with a larger number of collections, two elements will necessarily need to share the same priority level. Network node 150, when receiving a series of collections and priority levels for each of those collections, will haphazardly arrange the collections of the same priority level when returning these to the mobile device 110. As will be appreciated, this can create problems.

Figure 2:
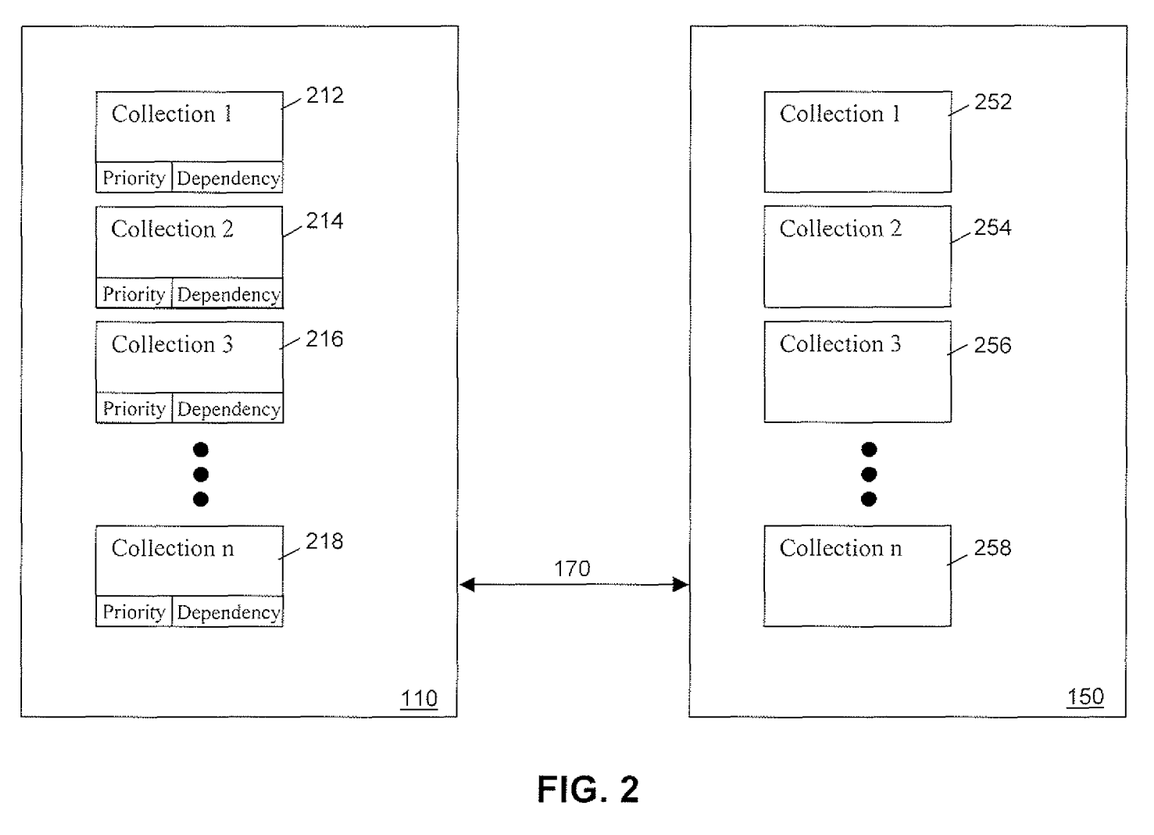
FIG. 2 is a block diagram illustrating a series of collections having both priority and dependency on the mobile device and a series of collections on the network node.

Reference is now made to FIG. 2. In FIG. 2, mobile device 110 communicates over interface 170 with network node 150. In the embodiment of FIG. 2, mobile device 110 includes a first collection 212, a second collection 214, a third collection 216, and collection n 218 where "n" is a positive integer. Similarly, network node 150 includes a first collection 252, a second collection 254, a third collection 256 and a collection n 258, where "n" is a positive integer.

As in the embodiment of FIG. 1, in the embodiment of FIG. 2, the mobile device 110 needs to synchronize first collection 212 with first collection 252, second collection 214 with second collection 254, third collection 216 with third collection 256 and so on until synchronizing collection n 218 with collection n 258.

In the embodiment of FIG. 2, collections 212, 214, 216 and 218 include both a priority and a dependency. The dependency field is added to the priority field in order to ensure that the priority field can stay the same for backwards compatibility purposes. In other words, the priority field remains the same in order that other databases or collections on the device expecting existing priority ordering still work. By subdividing the priority into various dependency levels, the ordering of collections at the same priority level can be accomplished correctly.

In a preferred embodiment, the dependency is a single byte added to the priority, thereby providing 255 dependency levels.

Figure 3:
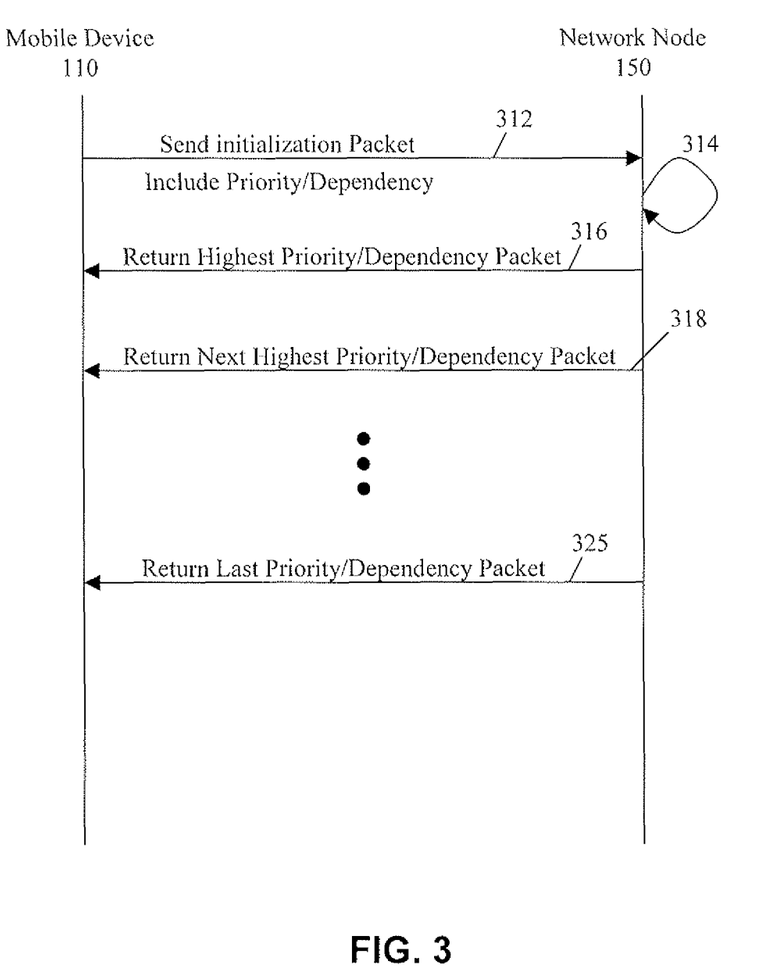
FIG. 3 is a sequence diagram showing a synchronization procedure between the mobile device and a network node.

Reference is made to FIG. 3. FIG. 3 shows exemplary communications between a mobile device 110 and a network node 150. Once a connection is made between a mobile device 110 and a network node 150, the mobile device sends an initialization packet 312 to network node 150. The initialization packet includes the priority and dependency of each collection within the mobile device 110.

Network node 150 receives the packet 312 and, at 314, sorts commands for the collections based on the priority and dependency levels received from mobile device 110. Thereafter, network node 150 returns the highest priority and dependency packet in message 316. Subsequently, network node 150 returns the next highest priority and dependency packet in message 318 and continues in this way until it returns the lowest priority and dependency packet in message 325. In an alternative embodiment, the collections themselves could be sorted The above allows for the growth of software to have a number of collections beyond the number of priority levels assigned to the mobile device. Further, it allows certain collections to be dependent upon other collections where the dependent collections can be put at the same priority level as the collections from which they depend and distinguish between the priority levels by assigning a dependency. This allows for synchronization to occur in the correct order.

The above is further illustrated with an example:

Example 1

A current mobile device may have 40 or 50 collections on the device that require synchronization. Two of these collections can include an auto-text collection, which allows a user to set an auto-correction for certain typographical errors that the user typically makes, and an options collection, which includes a list of options that the user sets.

One of the options in the options database is a "locale". The locale sets the language on the device and the auto-text collection is therefore dependent on the options collection.

Since the options on the device are important to the device, the options database typically receives the top priority. However, this can create problems. Specifically, each time a locale is changed either by the user or through USB, serial, wireless or other interface restore, the auto-text collection is reset and repopulated with entries for the given locale.

The change in locale causes the auto-text collection to be reset. However, the auto-text collection has already started to be synchronized based on the initialization packet 312 from FIG. 3. Thus, the auto-text collection would start synchronizing while a reset was being propagated through to the network. This results in a race condition and could cause loss of data or other problems on the device.

It is thus desirable to synchronize the auto-text prior to the synchronization of the options database. However, if the options database is already at a top priority, the only solution is to set the auto-text collection also to the top priority. This, however, does not necessarily solve the problem, since network node 150 from FIG. 1 could choose which priority level "one" synchronization to perform first. The selection is haphazard and therefore does not necessarily solve the problem of synchronizing a collection that depends from another collection first.

By augmenting each priority level with a dependency level, the synchronization can occur in the correct order. Specifically, if the options collection and the auto-text collection are both assigned priority level "one", the auto-text could be assigned dependency level "one", whereas the options collection could be assigned dependency level "two".

When receiving the initialization packet 312 from FIG. 3 at network node 150, the sort step 314 looks at both the priority and the dependency level and finds that the auto-text collection has a higher dependency than the options collection, and therefore the auto-text collection is synchronized first. The dependency therefore provides for the ordering of the collections at the same priority level.

In a further embodiment, not all dependencies will need to be utilized. Thus, as will be appreciated, non-contiguous dependencies could be used. Specifically, in the above example, the auto-text collection could be assigned a dependency level "5" and the options collection could be assigned a dependency level "10", leaving levels 6 to 9 unused. Thereafter, if another collection is placed on mobile device 110 that is dependent on the options collection, it can be assigned a higher dependency than the options collection without having to rearrange all of the corrections' dependency levels. Thus, the new collection could be assigned a dependency level "7" if it is less important than the auto-text collection but needs to be synchronized prior to the options collection.

Exemplary Network

The above can be implemented on a variety of networks in which a network node and a mobile device need to synchronize with each other. One example is illustrated in FIG. 4.

Figure 4:
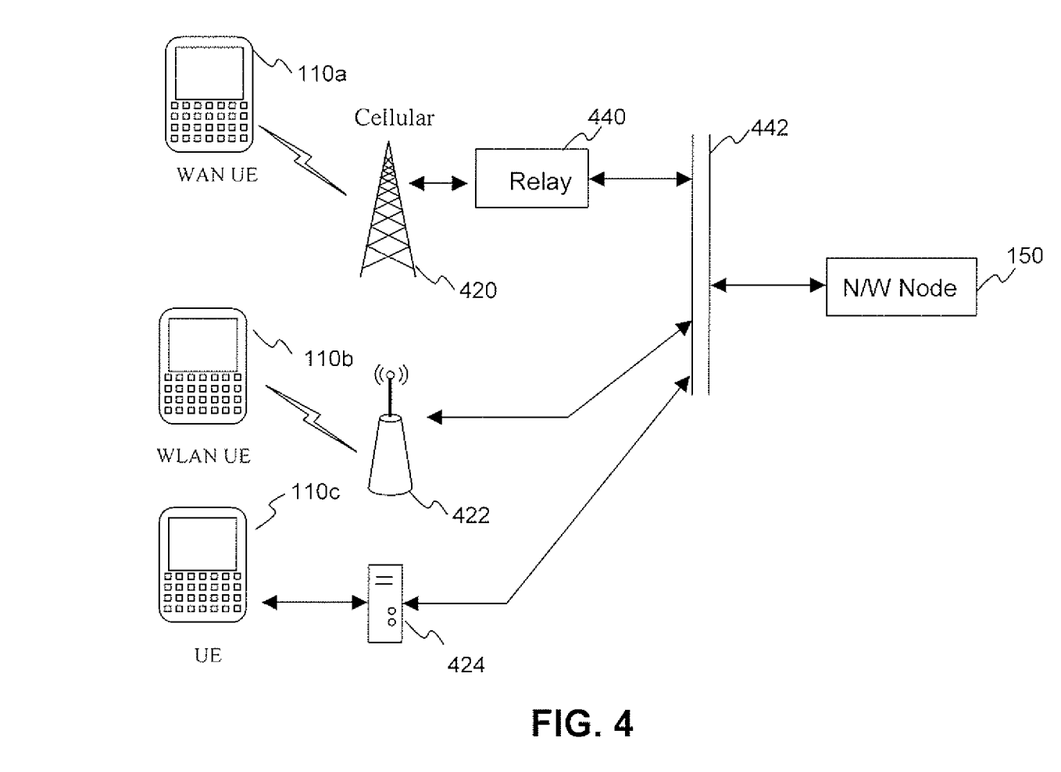
FIG. 4 illustrates an exemplary network containing both mobile device and a network node.

FIG. 4 illustrates an architectural overview for the synchronization of collections. Three mobile devices, 110*a*, 110*b* and 110*c*, are illustrated.

Mobile device 110*a* is a wide area network mobile device (WAN) which communicates with a cellular network 420.

Mobile device 110*b* is a wireless local area network (WLAN) mobile device which communicates with a data access port 422.

Mobile device 110*c* is a mobile device that is connected to a computer 424 through either physical or short-range wireless communications, such as a USB cable, Bluetooth™ or IrDA, among others.

As will be appreciated by those skilled in the art, a mobile device 110 from FIGS. 1 to 3 could implement one or more of the connection techniques of mobile devices 110*a*, 110*b* and 110*c* from FIG. 4. Thus, for example, a wide area network mobile device 110*a* could also include means for connecting the mobile device to a computer as with mobile device 110*c*. Further, a mobile device could include a wide area network connection (WAN connection) and a means to connect to a local computer all on one device. Other options would be apparent to those skilled in the art.

Mobile device 110*a* may connect through cellular network 420 to provide voice or data. As will be appreciated, various cellular networks exist, including, but not limited to, GSM, GPRS, CDMA, UMTS, WCDMA, among others.

Data from mobile device 110*a* proceeds through a relay 440, preferably through a firewall 442 to a network node 150.

Mobile device 110*b* communicates over a data access point for a wireless local network 422. Examples of WLAN technology include WiFi as one underlying technology of wireless local area networks.

As with a cellular connection, data is routed from data access point 422, preferably through firewall 442 to network node 150.

A mobile device 110*c* can be connected to a local computer 424 through a number of means as described above. If local computer 424 includes an Internet connection, then data can be routed through the Internet, through optional firewall 442 to a network node 150 for synchronization of collections.

Exemplary Mobile Device

As will be appreciated, the above can be implemented on any mobile device in which a collection needs to be synchronized with a collection on a network node. One exemplary mobile device is described below with reference to FIG. 5. This is not meant to be limiting, but is provided for illustrative purposes.

Figure 5:
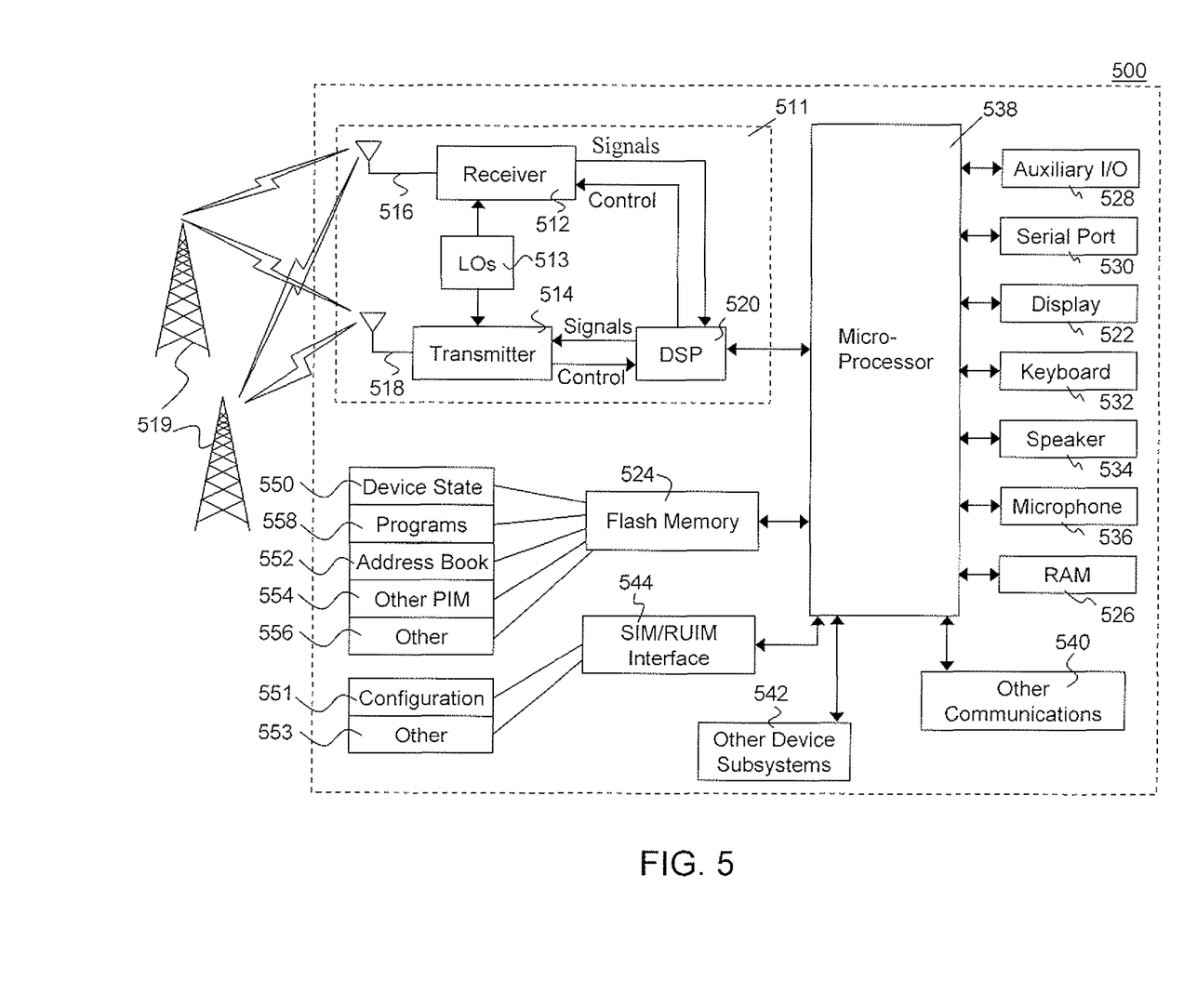
FIG. 5 shows a block diagram of an exemplary mobile device that can be used in association with the present method.

FIG. 5 is a block diagram illustrating a mobile device apt to be used with preferred embodiments of the apparatus and method of the present application. Mobile device 500 is preferably a two-way wireless communication device having at least voice and data communication capabilities. Mobile device 500 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 500 is enabled for two-way communication, it will incorporate a communication subsystem 511, including both a receiver 512 and a transmitter 514, as well as associated components such as one or more, preferably embedded or internal, antenna elements 516 and 518, local oscillators (LOs) 513, and a processing module such as a digital signal processor (DSP) 520. As will be apparent to those skilled in the field of communications, the particular design of the communication subsystem 511 will be dependent upon the communication network in which the device is intended to operate.

Network access requirements will also vary depending upon the type of network 519. In some CDMA networks, for example, network access is associated with a subscriber or user of mobile device 500. A CDMA mobile device may require a removable user identity module (RUIM) or a subscriber identity module (SIM) card in order to operate on a CDMA network. The SIM/RUIM interface 544 is normally similar to a card-slot into which a SIM/RUIM card can be inserted and ejected like a diskette or PCMCIA card. The SIM/RUIM card can have approximately 64K of memory and hold many key configuration 551, and other information 553 such as identification, and subscriber related information.

When required network registration or activation procedures have been completed, mobile device 500 may send and receive communication signals over the network 519. As illustrated in FIG. 5, network 519 can consist of multiple base stations communicating with the mobile device. For example, in a hybrid CDMA 1×EVDO system, a CDMA base station and an EVDO base station communicate with the mobile device and the mobile device is connected to both simultaneously. The EVDO and CDMA 1× base stations use different paging slots to communicate with the mobile device.

Signals received by antenna 516 through communication network 519 are input to receiver 512, which may perform such common receiver functions as signal amplification, frequency down conversion, filtering, channel selection and the like, and in the example system shown in FIG. 5, analog-to-digital (A/D) conversion. A/D conversion of a received signal allows more complex communication functions such as demodulation and decoding to be performed in the DSP 520. In a similar manner, signals to be transmitted are processed, including modulation and encoding for example, by DSP 520 and input to transmitter 514 for digital-to analog-conversion, frequency-up-conversion, filtering, amplification and transmission over the communication network 519 via antenna 518. DSP 520 not only processes communication signals, but also provides for receiver and transmitter control. For example, the gains applied to communication signals in receiver 512 and transmitter 514 may be adaptively controlled through automatic gain control algorithms implemented in DSP 520.

Mobile device 500 preferably includes a microprocessor 538, which controls the overall operation of the device. Communication functions, including at least data and voice communications, are performed through communication subsystem 511. Microprocessor 538 also interacts with further device subsystems such as the display 522, flash memory 524, random access memory (RAM) 526, auxiliary input/output (I/O) subsystems 528, serial port 530, one or more keyboards or keypads 532, speaker 534, microphone 536, other communication subsystem 540 such as a short-range communications subsystem and any other device subsystems generally designated as 542. Serial port 530 could include a USB port or other port known to those in the art.

Some of the subsystems shown in FIG. 5 perform communication-related functions, whereas other subsystems may provide "resident" or on-device functions. Notably, some subsystems, such as keyboard 532 and display 522, for example, may be used for both communication-related functions, such as entering a text message for transmission over a communication network, and device-resident functions such as a calculator or task list.

Operating system software used by the microprocessor 538 is preferably stored in a persistent store such as flash memory 524, which may instead be a read-only memory (ROM) or similar storage element (not shown). Those skilled in the art will appreciate that the operating system, specific device applications, or parts thereof, may be temporarily loaded into a volatile memory such as RAM 526. Received communication signals may also be stored in RAM 526.

As shown, flash memory 524 can be segregated into different areas for both computer programs 558 and program data storage 550, 552, 554 and 556. These different storage types indicate that each program can allocate a portion of flash memory 524 for their own data storage requirements. Various collections are also stored in flash memory 524. Microprocessor 538, in addition to its operating system functions, preferably enables execution of software applications on the mobile device. A predetermined set of applications that control basic operations, including at least data and voice communication applications for example, will normally be installed on mobile device 500 during manufacturing. Other applications could be installed subsequently or dynamically.

A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 519. In a preferred embodiment, the PIM data items are seamlessly integrated, synchronized and updated, via the wireless network 519, with the mobile device user's corresponding data items stored or associated with a host computer system. Further applications may also be loaded onto the mobile device 500 through the network 519, an auxiliary I/O subsystem 528, serial port 530, short-range communications subsystem 540 or any other suitable subsystem 542, and installed by a user in the RAM 526 or preferably a non-volatile store (not shown) for execution by the microprocessor 538. Such flexibility in application installation increases the functionality of the device and may provide enhanced on-device functions, communication-related functions, or both. For example, secure communication applications may enable electronic commerce functions and other such financial transactions to be performed using the mobile device 500.

In a data communication mode, a received signal such as a text message or web page download will be processed by the communication subsystem 511 and input to the microprocessor 538, which preferably further processes the received signal for output to the display 522, or alternatively to an auxiliary I/O device 528.

A user of mobile device 500 may also compose data items such as email messages for example, using the keyboard 532, which is preferably a complete alphanumeric keyboard or telephone-type keypad, in conjunction with the display 522 and possibly an auxiliary I/O device 528. Such composed items may then be transmitted over a communication network through the communication subsystem 511.

For voice communications, overall operation of mobile device 500 is similar, except that received signals would preferably be output to a speaker 534 and signals for transmission would be generated by a microphone 536. Alternative voice or audio I/O subsystems, such as a voice message recording subsystem, may also be implemented on mobile device 500. Although voice or audio signal output is preferably accomplished primarily through the speaker 534, display 522 may also be used to provide an indication of the identity of a calling party, the duration of a voice call, or other voice call-related information for example.

Serial port 530 in FIG. 5 would normally be implemented in a personal digital assistant (PDA)-type mobile device for which synchronization with a user's desktop computer (not shown) may be desirable, but is an optional device component. Such a port 530 would enable a user to set preferences through an external device or software application and would extend the capabilities of mobile device 500 by providing for information or software downloads to mobile device 500 other than through a wireless communication network. The alternate download path may for example be used to load an encryption key onto the device through a direct and thus reliable and trusted connection to thereby enable secure device communication. As will be appreciated by those skilled in the art, serial port 530 can further be used to connect the mobile device to a computer to act as a modem.

Other communications subsystems 540, such as a short-range communications subsystem, is a further optional component which may provide for communication between mobile device 500 and different systems or devices, which need not necessarily be similar devices. For example, the subsystem 540 may include an infrared device and associated circuits and components or a Bluetooth™ communication module to provide for communication with similarly enabled systems and devices.

The embodiments described herein are examples of structures, systems or methods having elements corresponding to elements of the techniques of this disclosure. This disclosure may enable those skilled in the art to make and use embodiments having alternative elements that likewise correspond to the elements or the techniques of this disclosure. The intended scope of the techniques of this disclosure thus includes other structures, systems or methods that do not defer from the techniques of the disclosure as described herein, and further includes other structures, systems or methods within substantial differences from the techniques of this disclosure as described herein.

The invention claimed is:

1. A method in a mobile device, the method comprising:
    assigning, by a processor, one or more dependency level values to collections of data, each collection of data having an existing priority level used to order the collections for synchronization, the dependency level values being represented by a dependency field appended to a priority field, wherein the dependency level values are assigned to the collections of data for extending the order of the collections within each existing priority level to change the order in which the collections are synchronized, and wherein the assigning assigns a non-contiguous dependency level value from any previously added dependency level values to collections; and
    sending the existing priority level and dependency level value of each collection to a network node to initiate synchronization of the collections of data based on the extended order, wherein the order of collections that share a similar existing priority level is determined by the dependency level values and the sending comprises transmitting an initialization packet from the mobile device, which includes the priority level and dependency level value of each collection.

2. The method of claim 1, wherein at least two of the collections of data share a same previously assigned priority level.

3. The method of claim 1, wherein the synchronization of the collections are ordered by the priority level first and by dependency level value second.

4. The method of claim 1, wherein the synchronization is performed between the mobile device and the network node over a wireless network.

5. A mobile device adapted for synchronizing collections of data, the device comprising:
   a processor for assigning one or more dependency level values to collections of data, each collection of data having an existing priority level used to order the collections for synchronization, the dependency level values being represented by a dependency field appended to a priority field, wherein the dependency level values are assigned to the collections of data for extending the order of the collections of data within each existing priority level to change the order in which the collections are synchronized and wherein the processor assigns a non-contiguous dependency level value from any previously added dependency level values to collections; and
   a communication subsystem for transmitting the existing priority level and dependency level value for each collection during synchronization to cause synchronization of the collections based on the extended order, wherein the order of collections that share a similar existing priority level is determined by the dependency level values and the communication subsystem transmits an initialization packet which includes the priority level and dependency level value of each collection.

6. A method in a network node, the method comprising:
   receiving, from a mobile device, an initialization packet containing priority levels and dependency level values associated with collections of data, the dependency level values being represented by a dependency field appended to a priority field, wherein the priority level comprises existing priority levels in an existing priority scheme to order the collections for synchronization and wherein the dependency level values are non-contiguous; and
   sending synchronization commands, for synchronizing the collections of data with the mobile device, based on an extended order of the collections, wherein the order of collections that share a similar priority level is determined by the dependency level values.

7. A network node comprising:
   a communications subsystem configured for:
      receiving, from a mobile device, an initialization packet containing priority levels and dependency level values associated with collections of data, the dependency level values being represented by a dependency field appended to a priority field, wherein the priority level comprises existing priority levels in an existing priority scheme to order the collections for synchronization and wherein the dependency level values are non-contiguous; and
      sending synchronization commands, for synchronizing the collections of data with the mobile device, based on an extended order of the collections, wherein the order of collections that share a similar priority level is determined by the dependency level values to change the order in which the collections are synchronized.

* * * * *

UNITED STATES PATENT AND TRADEMARK OFFICE
CERTIFICATE OF CORRECTION

PATENT NO.       : 8,473,637 B2                                  Page 1 of 1
APPLICATION NO.  : 11/678399
DATED            : June 25, 2013
INVENTOR(S)      : Brian Groux It is certified that error appears in the above-identified patent and that said Letters Patent is hereby corrected as shown below:

Title page, item [75] Inventor: replace "Bran Groux" with - "Brian Groux"

Signed and Sealed this
Fifteenth Day of October, 2013

Teresa Stanek Rea
*Deputy Director of the United States Patent and Trademark Office*